(12) United States Patent
Suzuki

(10) Patent No.: US 7,970,505 B2
(45) Date of Patent: Jun. 28, 2011

(54) CONTROL APPARATUS FOR HYBRID VEHICLE DRIVE SYSTEM

(75) Inventor: Toshinari Suzuki, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 326 days.

(21) Appl. No.: 12/053,347

(22) Filed: Mar. 21, 2008

(65) Prior Publication Data

US 2008/0234885 A1 Sep. 25, 2008

(30) Foreign Application Priority Data

Mar. 22, 2007 (JP) ................................. 2007-075667

(51) Int. Cl.
*B60K 6/46* (2007.10)
*B60K 6/22* (2007.10)

(52) U.S. Cl. .................... 701/22; 701/113; 180/65.275; 903/904

(58) Field of Classification Search .................... 701/22, 701/113; 180/65.275; 903/904
See application file for complete search history.

(56) References Cited

U.S. PATENT DOCUMENTS

| | | | | |
|---|---|---|---|---|
| 5,372,213 | A | * | 12/1994 | Hasebe et al. ............... 180/65.6 |
| 6,390,947 | B1 | * | 5/2002 | Aoki et al. ......................... 477/3 |
| 6,647,326 | B2 | | 11/2003 | Nakamori et al. |
| 6,760,655 | B2 | * | 7/2004 | Matsubara et al. ............. 701/54 |
| 7,617,025 | B2 | * | 11/2009 | Yamamoto et al. ............. 701/14 |
| 2002/0091034 | A1 | * | 7/2002 | Nakamori et al. ................. 477/3 |
| 2002/0107103 | A1 | * | 8/2002 | Nakamori et al. ............ 475/116 |
| 2002/0195287 | A1 | * | 12/2002 | Kayukawa et al. .......... 180/65.2 |
| 2003/0045988 | A1 | * | 3/2003 | Suzuki et al. .................... 701/54 |
| 2005/0178592 | A1 | * | 8/2005 | Yamamoto et al. .......... 180/65.2 |
| 2007/0149338 | A1 | | 6/2007 | Ebner et al. |

FOREIGN PATENT DOCUMENTS

| | | | |
|---|---|---|---|
| JP | 9286245 | A | 11/1997 |
| JP | 2001-041067 | A | 2/2001 |
| JP | 2001041067 | A * | 2/2001 |
| JP | 200363258 | A | 3/2003 |
| JP | 2003-172165 | A | 6/2003 |
| JP | 2006220114 | A | 8/2006 |
| JP | 2006-254628 | A | 9/2006 |
| JP | 2008-508479 | A | 3/2008 |
| WO | 2006/012995 | A1 | 2/2006 |

* cited by examiner

*Primary Examiner* — Mark Hellner
*Assistant Examiner* — Ari M Diacou
(74) *Attorney, Agent, or Firm* — Sughrue Mion, PLLC

(57) ABSTRACT

A control apparatus for a hybrid vehicle drive system including (a) an engine, (b) an electrically controlled differential portion having an input shaft connected to the engine, an output shaft, a differential mechanism, and an electric motor which is operatively connected to a rotary element of the differential mechanism and an operating state of which is controlled to control a differential state between rotating speeds of the input and output shafts, (c) a hydraulically operated automatic transmission portion which constitutes a part of a power transmitting path between the electrically controlled differential portion and a drive wheel of a hybrid vehicle, (d) a hydraulic control unit for controlling the hydraulically operated automatic transmission portion, (e) a mechanical oil pump operable by the engine to deliver a pressurized working fluid to the hydraulic control unit, and (f) an electric oil pump electrically operated independently of the mechanical oil pump, to deliver a pressurized working fluid to the hydraulic control unit, the control apparatus including a hybrid-drive-system starting portion configured to operate the engine, upon starting of the hybrid vehicle drive system, for operating the mechanical oil pump to deliver the pressurized working fluid of a predetermined pressure to the hydraulic control unit.

7 Claims, 8 Drawing Sheets

| | C1 | C2 | B1 | B2 | B3 | SPEED RATIO | STEPPING RATIO |
|---|---|---|---|---|---|---|---|
| 1st | ○ | | | | ○ | 3.357 | 1.54 |
| 2nd | ○ | | | ○ | | 2.180 | 1.53 |
| 3rd | ○ | | ○ | | | 1.424 | 1.42 |
| 4th | ○ | ○ | | | | 1.000 | SPREAD 3.36 |
| R | | ○ | | | ○ | 3.209 | |
| N | | | | | | | |

○ ENGAGED

CONTROL APPARATUS FOR HYBRID VEHICLE DRIVE SYSTEM

CROSS REFERENCE TO RELATED APPLICATION

The present application claims priority from Japanese Patent Application No. 2007-075667, which was filed on Mar. 22, 2007, the disclosure of which I herein incorporated by reference in its entirety.

BACKGROUND OF THE INVENTION

1. Field of the Invention

The present invention relates to a control apparatus for a hybrid vehicle drive system, and more particularly to system starting of a hybrid vehicle.

2. Discussion of Prior Art

There is known a control apparatus for a hybrid vehicle drive system including (a) an engine, and (b) an electrically controlled differential portion having an input shaft connected to the engine, an output shaft, a differential mechanism, and an electric motor which is connected to a rotary element of the differential mechanism and the operating state of which is controlled to control a differential state of rotating speeds of the input and output shafts. JP-2003-63258 A discloses an example of such a hybrid vehicle drive system. In hybrid drive systems as disclosed in the above-identified publication, a hybrid vehicle is generally driven by the vehicle drive electric motor with the engine held at rest in a running condition of the hybrid vehicle in which the operating efficiency of the engine is relatively low. In a running condition of the hybrid vehicle in which the engine is operated at a comparatively low speed to produce a comparatively small torque, for example, during starting of the hybrid vehicle, the vehicle drive electric motor is operated to drive the vehicle with the engine held at rest in view of a comparatively low operating efficiency of the engine The rotary elements of the differential mechanism or other rotary members are required to be lubricated even while the hybrid vehicle can be driven by a drive force produced by the vehicle drive electric motor with the engine held at rest. The above-identified publication proposes the use of a mechanical oil pump which is operated by the engine to lubricate the rotary members. When it is determined that the rotary members is required to be lubricated, an electricity generating electric motor provided as an electric generator is operated to operate the engine for a predetermined time for operating the mechanical oil pump, so that a lubricant is supplied to the rotary members.

In recently developed hybrid vehicle drive systems, the above-indicated electrically controlled differential portion is connected to a hydraulically operated automatic transmission portion. To start the hybrid vehicle equipped with such a hybrid vehicle drive system including such an automatic transmission portion, hydraulically operated coupling devices incorporated in the automatic transmission portion to establish a desired operating position thereof must be selectively supplied with a pressurized working fluid. To this end, the mechanical oil pump is operated by the engine driven by the electricity generating electric motor, to supply the pressurized working fluid to the relevant hydraulically operated coupling devices of the automatic transmission portion, upon starting of the hybrid vehicle with the vehicle drive electric motor with the engine held at rest. In this condition, however, the engine is operated with a low operating efficiency, leading to a risk of deterioration of fuel economy of the vehicle. In view of this drawback, it is considered to use an electric oil pump which is provided in addition to the mechanical oil pump and which is electrically driven to actuate the desired hydraulically operated coupling devices of the automatic transmission portion while the engine is at rest.

The use of those two oil pumps makes it possible to reduce the risk of deterioration of the fuel economy of the hybrid vehicle, owing to the operation of the electric oil pump rather than the engine in the running condition of the vehicle in which the operating efficiency of the engine is relatively low. It is generally required to start the hybrid vehicle drive system before starting of the hybrid vehicle. The starting of the hybrid vehicle drive system requires a predetermined length of time before the drive system becomes ready to start. In this respect, it is noted, for example, that the hybrid vehicle drive system is provided with a high-voltage electric system for driving the vehicle drive electric motor. To start this high-voltage electric system, it is required to effect a diagnosis of the high-voltage electric system for circuit protection, which requires a predetermined length of time. Where the hybrid vehicle drive system includes the automatic transmission portion operated under the control of a hydraulic control unit, this hydraulic control unit is required to be supplied with the pressurized working fluid to permit running of the hybrid vehicle, as a part of the starting procedure of the hybrid vehicle drive system. Where the supply of the pressurized working fluid to the hydraulic control unit is achieved by the electric oil pump, the supply of the fluid requires a further time since the electric oil pump becomes operable only after a high voltage of the high-voltage electric system has been lowered to a suitable level by a DCDC converter after the high-voltage electric system is started. Thus, the hybrid vehicle drive system provided with the automatic transmission portion requires a relatively long time for starting thereof, which may give the operator of the hybrid vehicle a discomfort associated with slow or delayed starting of the hybrid vehicle.

SUMMARY OF THE INVENTION

The present invention was made in view of the background art discussed above. It is therefore an object of this invention to provide a control apparatus for a hybrid vehicle drive system including an electrically controlled differential portion and an automatic transmission portion, which control apparatus is configured to shorten the time required for starting of the hybrid vehicle drive system, for rapid starting of the hybrid vehicle.

The object indicated above can be achieved according to the principle of the present invention, which provides a control apparatus for a hybrid vehicle drive system including (a) an engine, (b) an electrically controlled differential portion having an input shaft connected to the engine, an output shaft, a differential mechanism, and an electric motor which is operatively connected to a rotary element of the differential mechanism and an operating state of which is controlled to control a differential state between rotating speeds of the input and output shafts, (c) a hydraulically operated automatic transmission portion which constitutes a part of a power transmitting path between the electrically controlled differential portion and a drive wheel of a hybrid vehicle, (d) a hydraulic control unit for controlling the hydraulically operated automatic transmission portion, (e) a mechanical oil pump operable by the engine to deliver a pressurized working fluid to the hydraulic control unit, and (f) an electric oil pump electrically operated independently of the mechanical oil pump, to deliver a pressurized working fluid to the hydraulic control unit, the control apparatus comprising a hybrid-drive-system starting portion configured to operate the engine, upon starting of the hybrid vehicle drive system, for operating the mechanical oil pump to deliver the pressurized working fluid of a predetermined pressure to the hydraulic control unit.

According to the hybrid vehicle drive system control apparatus of the present invention constructed as described above comprises the hybrid-drive-system starting portion which is configured to operate the engine, upon starting of the hybrid vehicle drive system, for operating the mechanical oil pump to deliver the pressurized working fluid of the predetermined pressure to the hydraulic control unit. Namely, before the electric oil pump is operated to deliver the pressurized fluid, the mechanical oil pump is operated by the engine to deliver the working fluid of the predetermined pressure to the hydraulic control unit. Accordingly, the present control apparatus eliminates a need of awaiting slow or delayed starting of the electric oil pump, and makes it possible to shorten the time required for starting the hybrid vehicle drive system, by operating the mechanical oil pump prior to the slow starting of the electric oil pump.

In a first preferred form of the invention, the predetermined pressure of the pressurized working fluid is a pressure which permits the hydraulically operated automatic transmission portion to have a torque capacity enough to transmit an input torque received by the automatic transmission portion 20 during starting of the hybrid vehicle.

According to the first preferred form of the control apparatus described above, the hybrid vehicle can be started immediately after the starting of the hybrid vehicle drive system, since the pressure of the working fluid delivered from the mechanical oil pump permits the hydraulically operated automatic transmission portion to have the torque capacity enough to transmit its input torque during starting of the hybrid vehicle.

In a second preferred form of the invention, the hybrid-drive-system starting portion operates the first electric motor to start the engine, upon starting of the hybrid vehicle drive system, such that the operating speed of the engine is raised to a level at which ignition of the engine is possible.

According to the second preferred form of the control apparatus described above, the engine can be suitably ignited and rapidly started, since the engine is driven by the first electric motor so as to raise the engine speed to the level at which the ignition of the engine is possible.

In a third preferred form of the invention, the hybrid-drive-system starting portion includes a determining portion configured to determine whether the electric oil pump can be started, and the hybrid-drive-system starting portion starts the electric oil pump when the determining portion has determined that the electric oil pump can be started, the hybrid-drive-system starting portion stopping the mechanical oil pump when a pressure of the pressurized working fluid delivered from the electric oil pump to the hydraulic control unit is raised to a predetermined level.

According to the third preferred form of the control apparatus wherein the electric oil pump is started when the determining portion has determined that the electric oil pump can be started, the hybrid-drive-system starting portion stops the mechanical oil pump when the pressure of the pressurized working fluid delivered from the electric oil pump to the hydraulic control unit is raised to the predetermined level. In this form of the invention, the mechanical and electric oil pumps are selectively operated with high operating efficiency. Generally, a hybrid vehicle tends to have a low operating efficiency of its engine during its starting or during its running at a relatively low speed or with a relatively small drive torque. In view of this tendency, the hybrid vehicle is usually driven by an electric motor with the engine held at rest, during its starting or low-speed or small-torque running. In the present preferred form of the control apparatus, the mechanical oil pump is stopped, that is, the engine is stopped when the electric oil pump becomes operable to deliver the working fluid of the predetermined pressure. Accordingly, the deterioration of the fuel economy of the hybrid vehicle due to operation of the engine during starting of the vehicle can be reduced.

In a fourth preferred form of this invention, the electrically controlled differential portion is operable as a continuously variable transmission mechanism by controlling the operating state of the electric motor.

According to the fourth preferred form of the control apparatus described above wherein the electrically controlled differential portion and the hydraulically operated automatic transmission portion cooperate to function as a continuously variable transmission mechanism the output torque of which can be smoothly changed. Further, the electrically controlled differential portion can function not only as an electrically controlled continuously variable transmission the speed ratio of which is continuously variable, but also as a step-variable transmission the speed ratio of which is variable in steps, so that an overall speed ratio of the hybrid vehicle drive system can be changed in steps, whereby the vehicle drive torque can be rapidly changed.

In a fifth preferred form of the invention, the hydraulically operated automatic transmission portion is a step-variable automatic transmission a speed ratio of which is variable in steps.

According to the fifth preferred form of the control apparatus described above, the electrically controlled differential portion functioning as an electrically controlled continuously variable transmission cooperates with the step-variable automatic transmission to constitute a continuously variable transmission the output torque of which can be smoothly changed. While the speed ratio of the electrically controlled differential portion is held constant, the differential portion and the step-variable automatic transmission cooperate to function substantially as a step-variable transmission, so that the overall speed ratio of the hybrid vehicle drive system can be changed in steps, whereby the vehicle drive torque can be rapidly changed.

In a sixth preferred form of the present invention, the differential mechanism is a planetary gear set having as the rotary elements a first element in the form of a carrier connected to the input shaft of the electrically controlled differential portion and the engine, a second element in the form of a sun gear connected to the electric motor, and a third element in the form of a ring gear connected to the output shaft of the electrically controlled differential portion. In this form of the invention, the axial dimension of the differential mechanism can be shortened, and the differential mechanism constituted by the single planetary gear set can be simplified in construction.

In one advantageous arrangement of the sixth preferred form of the invention, the planetary gear set is a single-pinion type planetary gear set. In this arrangement, the axial dimension of the differential mechanism can be shortened, and the differential mechanism constituted by the single single-pinion type planetary gear set can be simplified in construction.

In a seventh preferred form of the invention, the hybrid vehicle drive system has an overall speed ratio which is defined by a speed ratio (gear ratio) of the hydraulically operated automatic transmission portion and a speed ratio of the electrically controlled differential portion. In this case, the vehicle drive force can be changed over a wide range, by utilizing the speed ratio of the automatic transmission portion.

BRIEF DESCRIPTION OF THE DRAWINGS

The above and other objects, features, advantages, and technical and industrial significance of this invention will be better understood by reading the following detailed description of a preferred embodiment of the present invention, when considered in connection with the accompanying drawings, in which.

DETAILED DESCRIPTION OF THE PREFERRED EMBODIMENT

Figures 1, 2:
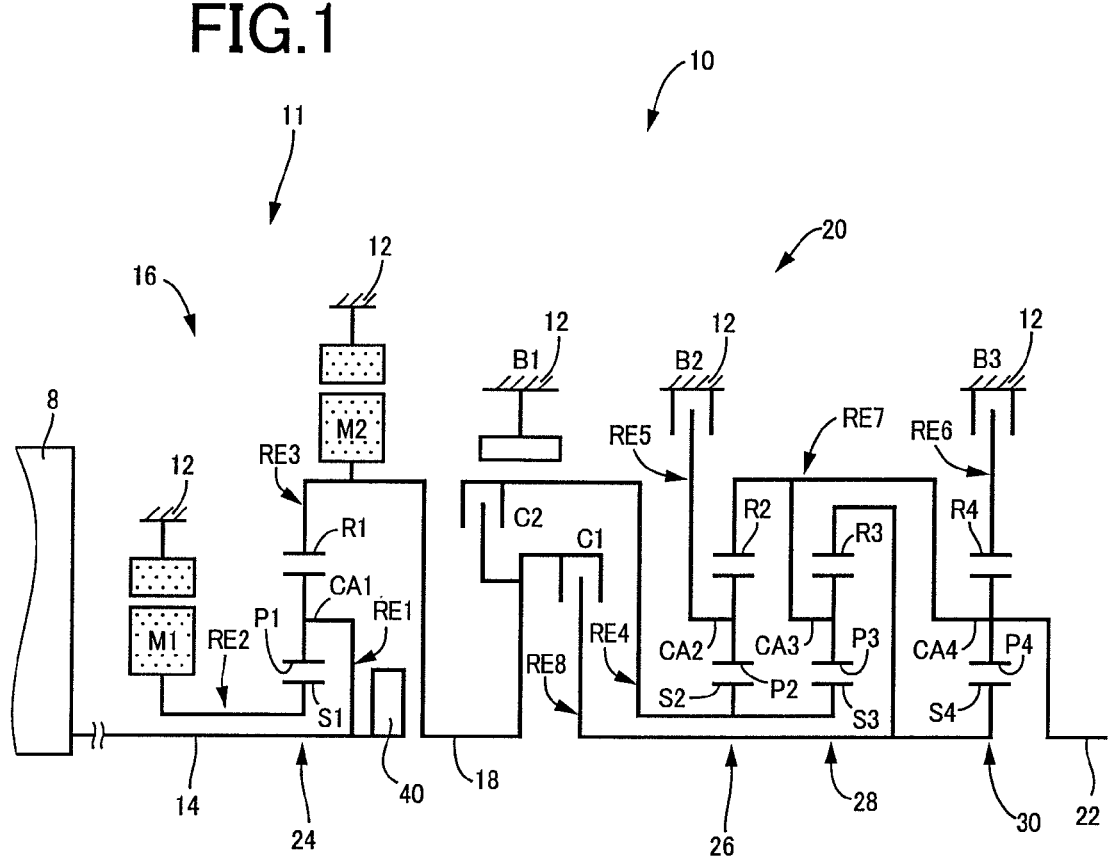
FIG. 1 is a schematic view showing an arrangement of a hybrid vehicle drive system which is controlled by a control apparatus constructed according to one embodiment of this invention.
FIG. 2 is a table indicating shifting actions of an automatic transmission portion provided in the hybrid vehicle drive system of FIG. 1, in relation to different combinations of operating states of hydraulically operated frictional coupling devices to effect the respective shifting actions.
Figure 7:
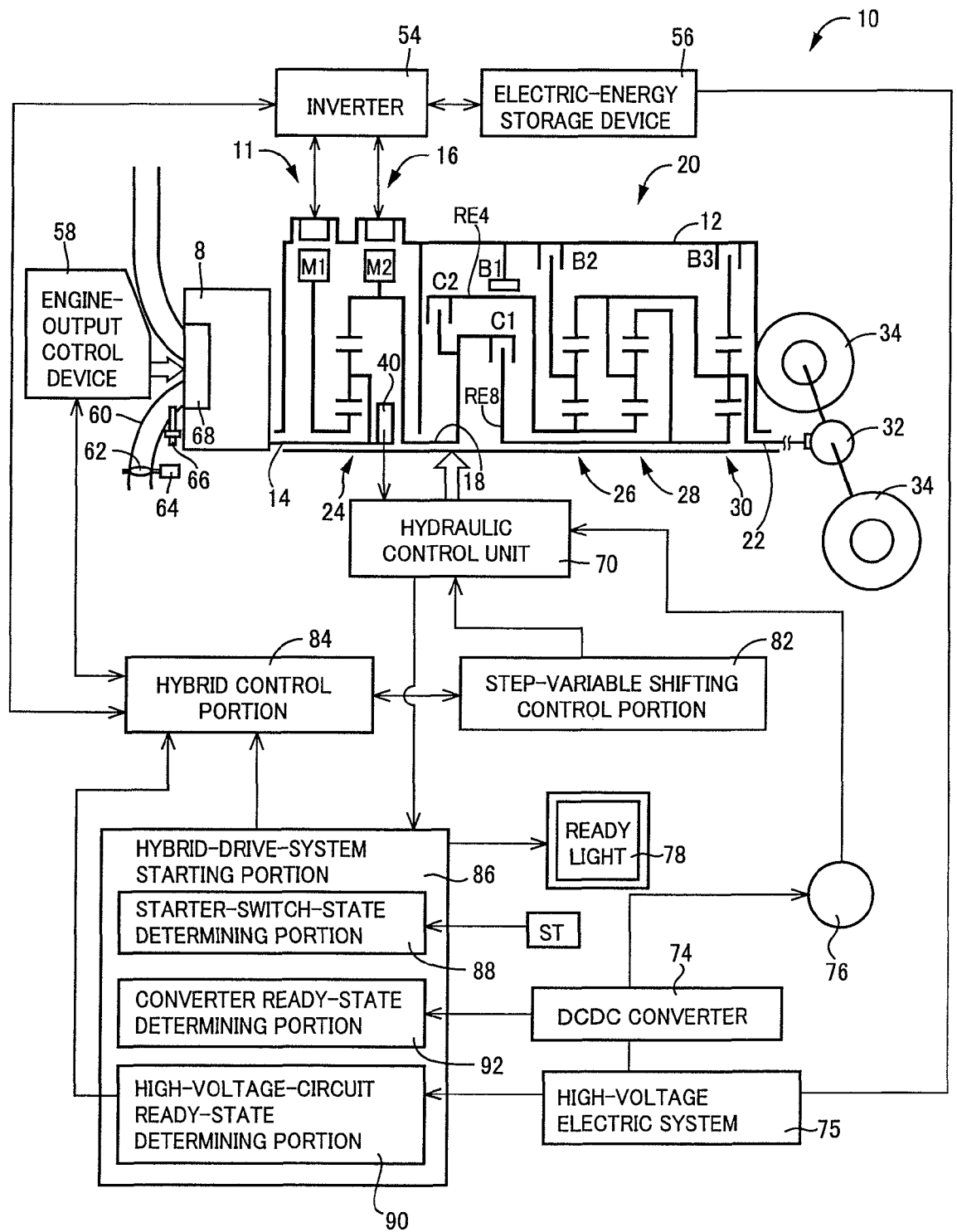
FIG. 7 is a functional block diagram illustrating major control functions of the electronic control device of FIG. 4.

Referring to the drawings, the preferred embodiment of this invention will be described in detail Referring first to the schematic view of FIG. 1, there is shown a transmission mechanism 10 constituting a part of a drive system for a hybrid vehicle, which drive system is controlled by a control apparatus constructed according to one embodiment of this invention. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of a hydraulic automatic transmission portion 20 disposed between the differential portion 11 and drive wheels 34 (shown in FIG. 7) of the hybrid vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a transverse FR vehicle (front-engine, rear-drive vehicle), and is disposed between a drive power source in the form of an internal combustion engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper. It will be understood that the transmission mechanism 10 serves as the hybrid vehicle drive system of the present invention, while the differential portion 11 serves as an electrically controlled differential portion of the hybrid vehicle drive system.

A mechanically operated oil pump 40 (hereinafter referred to as "mechanical oil pump 40") operated by the engine 8 is built in the transmission mechanism 10. A working fluid pressurized by the mechanical oil pump 40 is used, for example, for actuating hydraulically operated frictional coupling devices described below, which are incorporated in the automatic transmission portion 20 to establish a selected one of operating positions of the automatic transmission portion 20, In the present transmission mechanism 10 constructed as described above, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiments of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate an electric energy and a reaction force, while the second electric motor M2 should function at least as a drive power source operable to produce a vehicle drive force.

The power distributing mechanism 16 includes, as a major component, a first planetary gear set 24 of a single pinion type having a gear ratio ρ1 of about 0.418, for example. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio ρ1 is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The power distributing mechanism 16 constructed as described above is operated in a differential state in which three elements of the first planetary gear set 24 consisting of the first sun gear S1, first carrier CA1 and first ring gear R1 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Thus, the differential portion 11 (power distributing mechanism 16) functions as an electric differential device, which is operable in a continuously-variable shifting state (electrically established CVT state) in which the rotating speed of the power transmitting member 18 is continuously variable, irrespective of the rotating speed of the engine 8, namely, placed in the differential state in which a speed ratio γ0 (rotating speed $N_{IN}$ of the input shaft 14/rotating speed $N_{18}$ of the power transmitting member 18) of the differential portion 11 is continuously changed from a minimum value γ0min to a maximum value γ0max, that is, in the continuously-variable shifting state in which the differential portion 11 functions as an electrically controlled continuously-variable transmission the speed ratio γ0 of which is continuously variable from the minimum value γ0min to the maximum value γ0max. It will be understood that the power transmitting member 18 functions as an output shaft of the differential mechanism in the form of the power distributing mechanism 16.

The automatic transmission portion 20 is a step-variable automatic transmission which constitutes a part of a power transmitting path between the differential portion 11 and the drive wheels 34. The automatic transmission portion 20 includes a single-pinion type second planetary gear set 26, a single-pinion type third planetary gear set 28 and a single-pinion type fourth planetary gear set 30. Thus, the automatic transmission portion 20 is a multiple-step transmission of a planetary gear type. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio ρ2 of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio ρ3 of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to shift the automatic transmission portion 20. Accordingly, the output of the engine 8 is transited to the automatic transmission portion 20 through the differential portion 11, and the first clutch C1 and/or second clutch C2. The first clutch C1 and the second clutch C2 function as input clutches of the automatic transmission portion 20. When at least one of the first and second clutches C1 and C2 is placed in the engaged state, the power transmitting path between the power transmitting member 18 and the automatic transmission portion 20 is placed in a power transmitting state in which a vehicle drive force can be transmitted through the power transmitting path. When both of the first and second clutches C1, C2 are placed in the released state, the power transmitting path is placed in a power cut-off state in which the vehicle drive force cannot be transmitted through the power transmitting path.

The automatic transmission portion 20 is operable to perform a so-called "clutch-to-clutch" shifting action to establish a selected one of its operating positions (gear positions) by an engaging action of one of coupling devices and a releasing action of another coupling device. The above-indicated operating positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state. It will be understood that the clutches C1, C2 and brakes B1-B3 function as the hydraulically operated frictional coupling devices which are selectively engaged to establish the selected one of the operating positions of the automatic transmission portion 20.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 cooperate to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

When the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting-member speed $N_{18}$") is continuously changed, so that the speed ratio of the hybrid vehicle drive system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the differential portion 11 functions as the continuously-variable transmission while the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
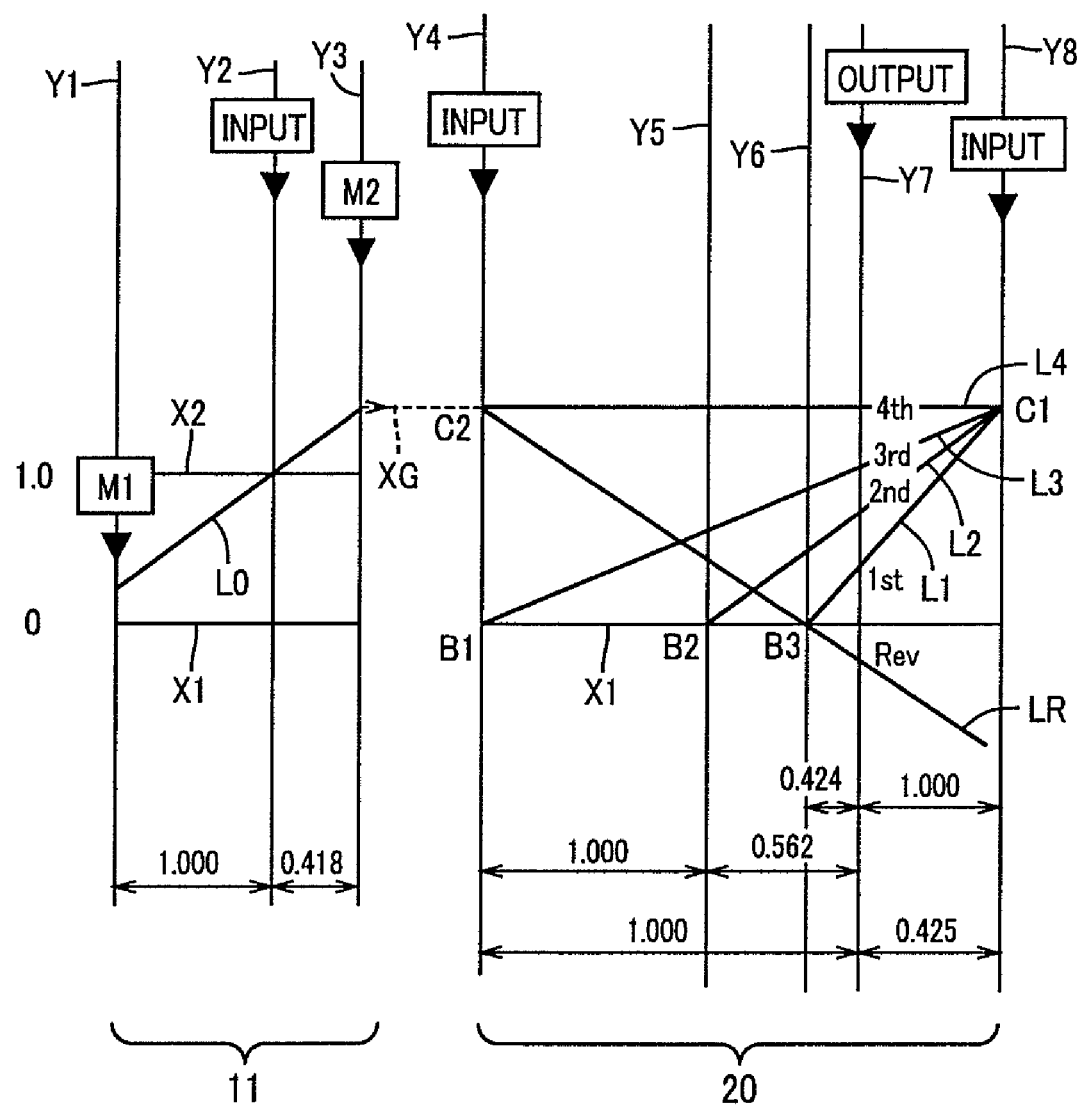
FIG. 3 is a collinear chart indicating relative rotating speeds of rotary elements of a differential portion and the automatic transmission portion of the hybrid vehicle drive system of FIG. 1.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, S0 that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant.

When the rotating speed of the first electric motor M1 is controlled such that the speed ratio γ0 of the differential portion 11 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed NE is input to the eighth rotary element RE8 of the automatic transmission portion 20. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

Figure 4:
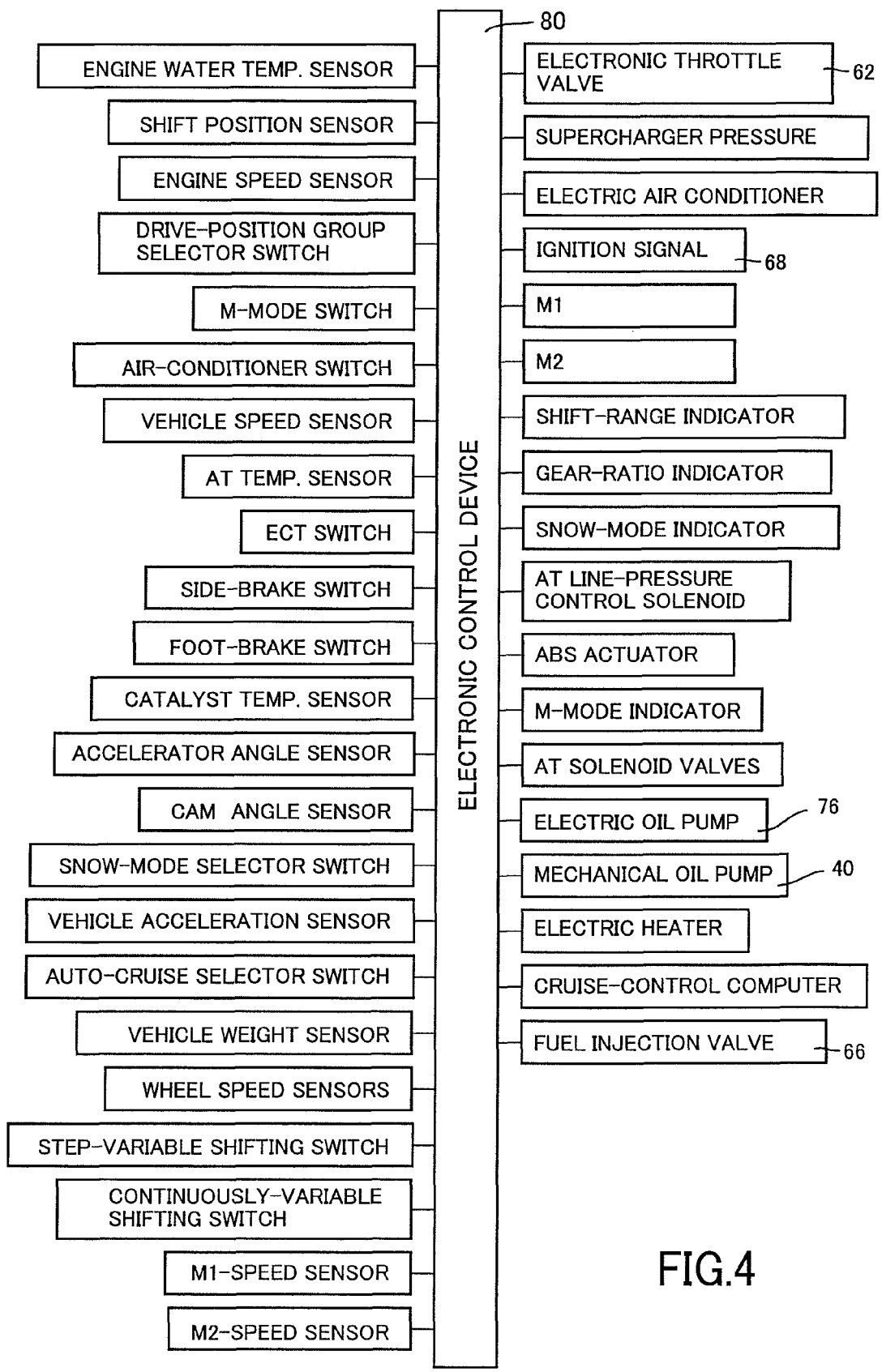
FIG. 4 is a view indicating input and output signals of an electronic control device serving as the control apparatus according to the embodiment of this invention to control the hybrid vehicle drive system of FIG. 1.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the ROM, to implement hybrid drive controls of the engine 8 and first and second electric motors M1 and M2, and drive controls such as shifting controls of the automatic transmission portion 20.

The electronic control device 80 is arranged to receive from various sensors and switches shown in FIG. 4, various signals such as: a signal indicative of a temperature $TEMP_W$ of cooling water of the engine 8; a signal indicative of a selected one of operating positions $P_{SH}$ of a shift lever 52 (shown in FIG. 6); a signal indicative of the number of operations of the shift lever 52 from a manual forward-drive shifting position M (described below); a signal indicative of the operating speed $N_E$ of the engine 8; a signal indicative of a value indicating a selected group of forward-drive positions of the transmission mechanism 10; a signal indicative of an M mode (manual shifting mode); a signal indicative of an operated state of an air conditioner; a signal indicative of a vehicle speed V corresponding to the rotating speed $N_{OUT}$ of the output shaft 22 (hereinafter referred to as "output shaft speed"); a signal indicative of a temperature TOIL of a working fluid or oil of the automatic transmission portion 20; a signal indicative of an operated state of a side brake; a signal indicative of an operated state of a foot brake; a signal indicative of a temperature of a catalyst; a signal indicative of a required amount of an output of the vehicle in the form of an amount of operation (an angle of operation) $A_{CC}$ of a manually operable vehicle accelerating member in the form of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of a rotating speed $N_{M1}$ of the first electric motor M1 (hereinafter referred to as "first electric motor speed $N_{M1}$"); a signal indicative of a rotating speed $N_{M2}$ of the second electric motor M2 (hereinafter referred to as "second electric motor speed $N_{M2}$"); and a signal indicative of an amount of electric energy SOS stored in an electric-energy storage device 60 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $\theta_{TH}$ of an electronic throttle valve 62 disposed in a suction pipe 60 of the engine 8, a signal to control an amount of injection of a fuel by a fuel injecting device 66 into the suction pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves in the form of linear solenoid valves incorporated in a hydraulic control unit 70 (shown in FIG. 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; signals to control the mechanical oil pump 40 and an electrically operated oil pump 76 (hereinafter referred to as "electric oil pump") which are hydraulic pressure sources for generating hydraulic pressures that are regulated to the line pressure PL; a signal to drive an electric heater; and a signal to be applied to a cruise-control computer.

Figure 5:
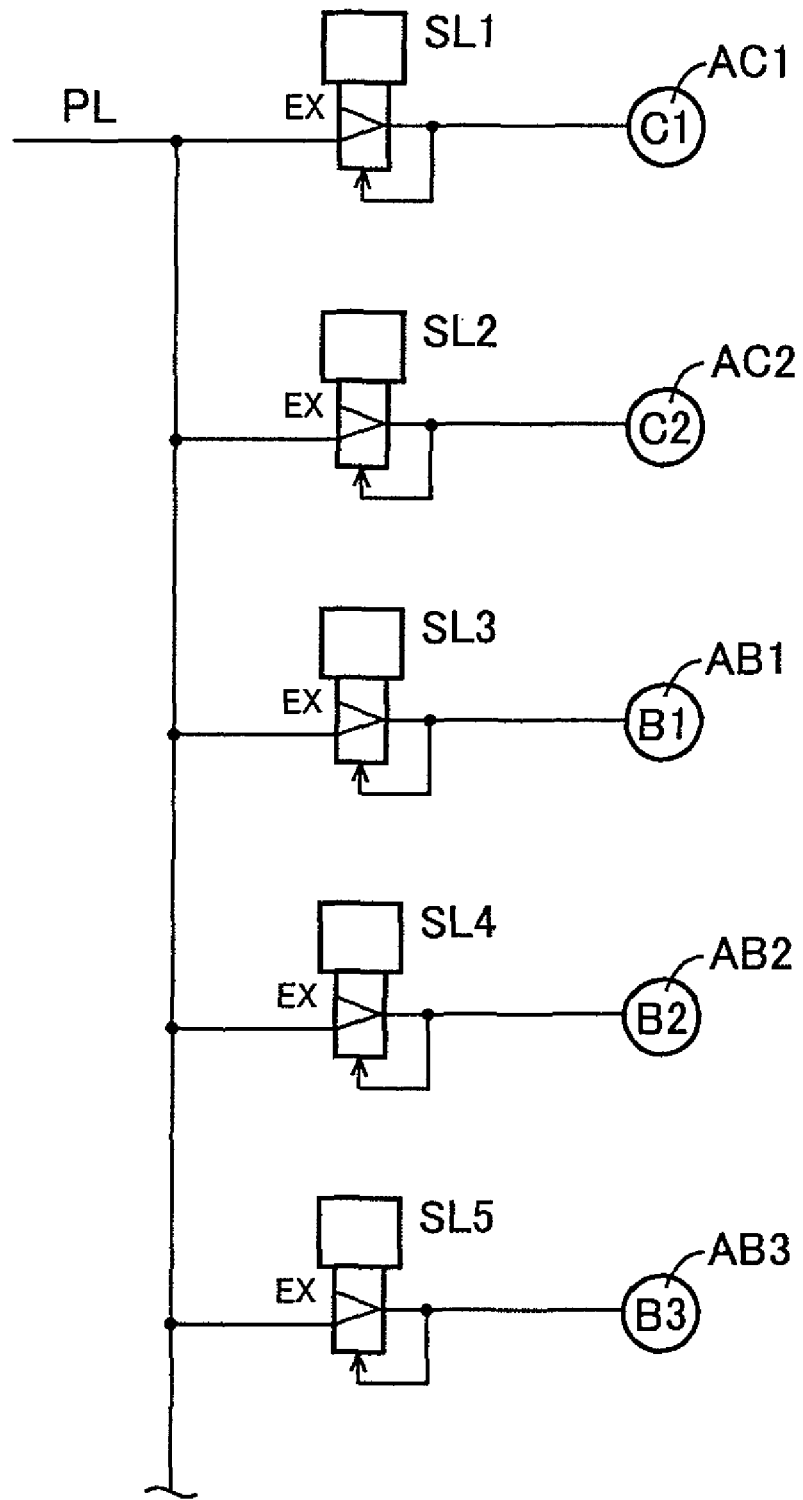
FIG. 5 is a circuit diagram showing hydraulic actuators provided in a hydraulic control unit, for operating clutches and brakes incorporated in the automatic transmission portion, and linear solenoid valves for controlling the hydraulic actuators.

FIG. 5 shows a hydraulic circuit of the hydraulic control unit 70 arranged to control linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by the mechanical oil pump 40 driven by the engine 8 or the electric oil pump 76 provided in addition to the mechanical oil pump 40, and which is regulated by a relief-type pressure regulator valve according to a load of the engine 8 as represented by the operation amount $A_{CC}$ of the accelerator pedal or the opening angle of the electronic throttle valve 62, for example. It will be understood that the mechanical oil pump 40 and the electric oil pump 76 are operable independently of each other, to deliver the pressurized working fluid to the hydraulic control unit 70.

The linear solenoid valves SL1-SL6 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3, so that the appropriate two coupling devices (C1, C2, B1, B2, B3) are engaged to shift the automatic transmission portion 20 to the selected operating position or gear position. A shifting action of the automatic transmission portion 20 from one position to another is a so-called "clutch-to-clutch" shifting action involving an engaging action of the coupling devices (C, B) and a releasing action another of the coupling devices, which take place concurrently.

Figure 6:
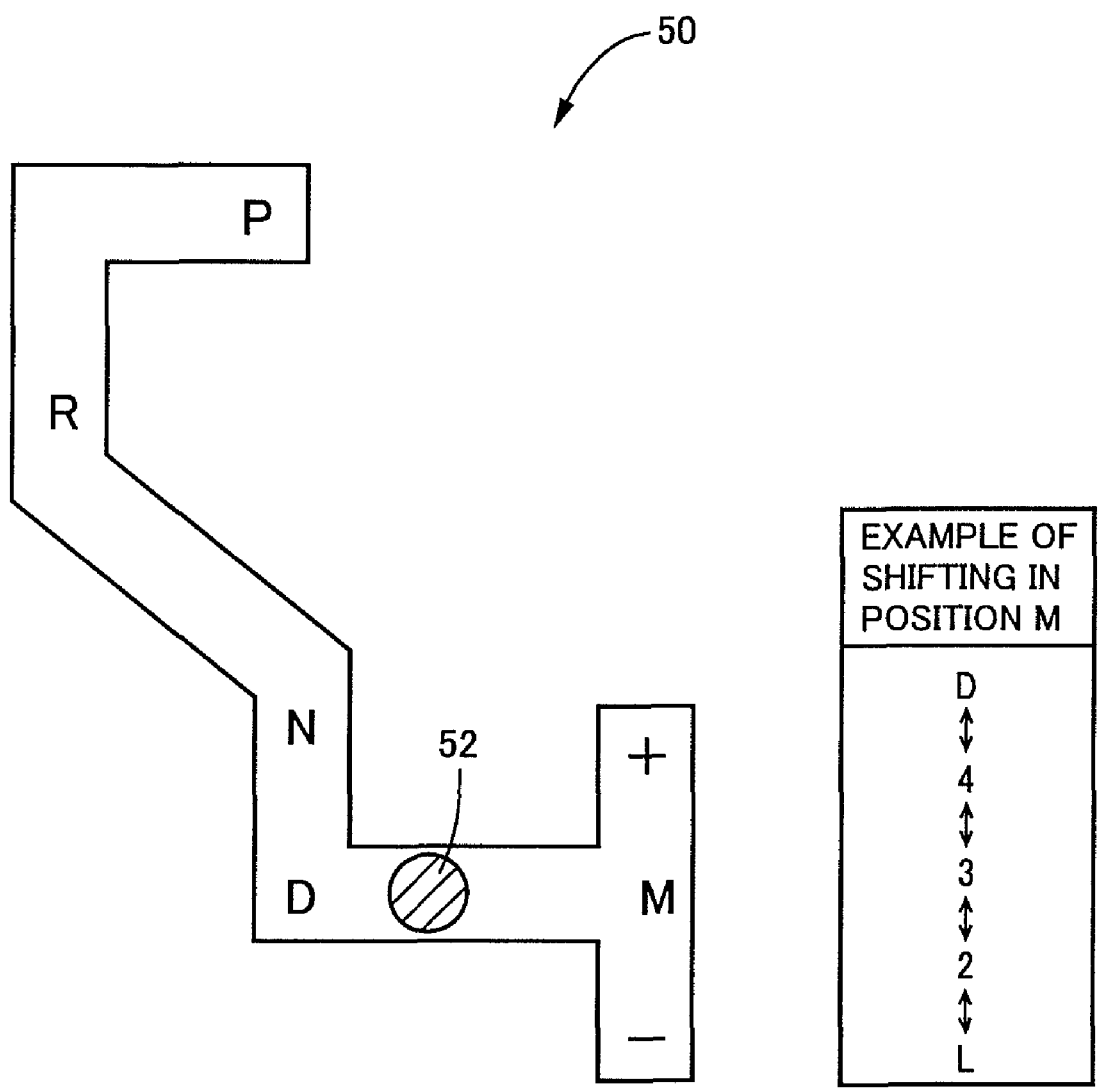
FIG. 6 is a view showing an example of a manually operated shifting device including a shift lever and operable to select one of a plurality of shift positions.

FIG. 6 shows an example of a manually operable shifting device in the form of a shifting device 50. The shifting device 50 includes the above-described shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of: a parking position P for placing the drive system 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the drive system 10 in the neutral state; an automatic forward-drive shifting position D for establishing an automatic shifting mode; and the above-indicated manual forward-drive shifting position M for establishing a manual shifting mode. In the automatic shifting mode, the overall speed ratio $\gamma T$ is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the operating positions $P_{SH}$, the hydraulic control unit 70 is electrically operated to switch the hydraulic circuit to establish the rear-drive position R, neutral position N, and one of the forward-drive first through fourth gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

Figure 8:
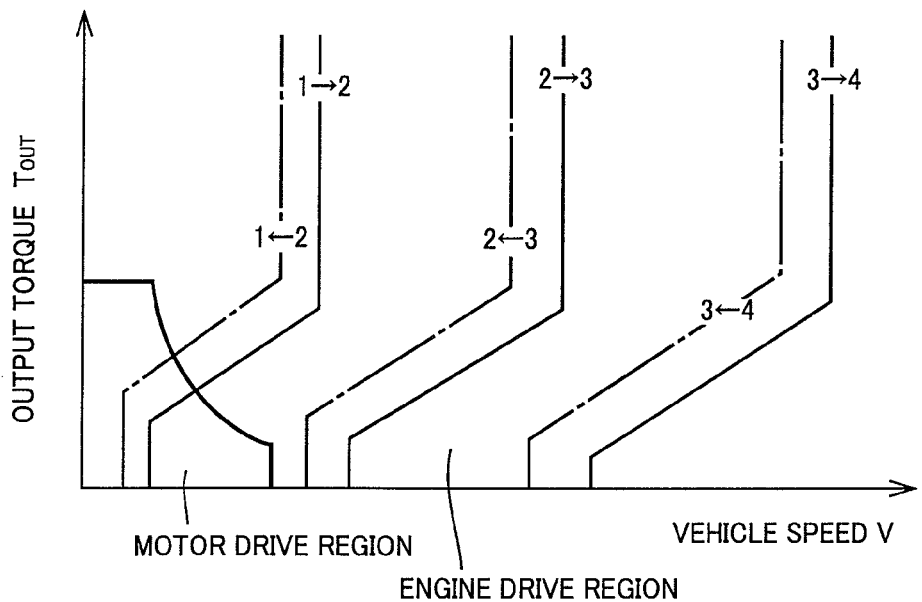
FIG. 8 is a view illustrating an example of a stored shifting boundary line map used for determining a shifting action of the automatic transmission portion, and an example of a stored drive-power-source switching boundary line map defining boundary lines between an engine drive region and a motor drive region for switching between an engine drive mode and a motor drive mode.

Referring to the functional block diagram of FIG. 7, the electronic control device 80 includes a step-variable shifting control portion 82, a hybrid control portion 84, and a hybrid-drive-system starting portion 86. The step-variable shifting control portion 82 is configured to determine whether a shifting action of the automatic transmission portion 20 should take place, that is, to determine the gear position to which the automatic transmission portion 20 should be shifted. This determination is made on the basis of a condition of the vehicle represented by the vehicle speed V and a required output torque $T_{OUT}$ of the automatic transmission portion 20, and according to a stored shifting boundary line map (shifting control map or relation) which represents shift-up boundary lines indicated by solid lines in FIG. 8 and shift-down boundary lines indicated by one-dot chain lines in FIG. 8.

The step-variable shifting control portion 82 generates a shifting command (hydraulic control command) to be applied to the hydraulic control unit 70, to engage and release the appropriate two hydraulically operated frictional coupling devices (C1, C2, B1, B2, B3), for establishing the determined gear position of the automatic transmission portion 20 according to the table of FIG. 2. Described in detail, the step-variable shifting control portion 82 commands the hydraulic control unit 70 to control the appropriate two linear solenoid valves SL incorporated in the hydraulic control unit 70, for activating the appropriate hydraulic actuators of the appropriate two frictional coupling devices (C, B) to concurrently engage one of the two frictional coupling devices and release the other frictional coupling device, to effect the clutch-to-clutch shifting action of the automatic transmission portion 20 to the determined gear position.

The hybrid control portion 84 controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio γ0 of the differential portion 11 operating as the electric continuously-variable transmission. For instance, the hybrid control portion 84 calculates a target (required) vehicle output at the present running speed V of the vehicle, on the basis of the operation amount $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1. The hybrid control portion 84 calculates a target output of the engine 8 to obtain the calculated target total vehicle output, while taking account of a power transmission loss, a load acting on various devices of the vehicle, an assisting torque generated by the second electric motor M2, etc. The hybrid control portion 84 controls the speed $N_E$ and torque $T_E$ of the engine 8, so as to obtain the calculated target engine output, and the amount of generation of the electric energy by the first electric motor M1.

Figure 9:
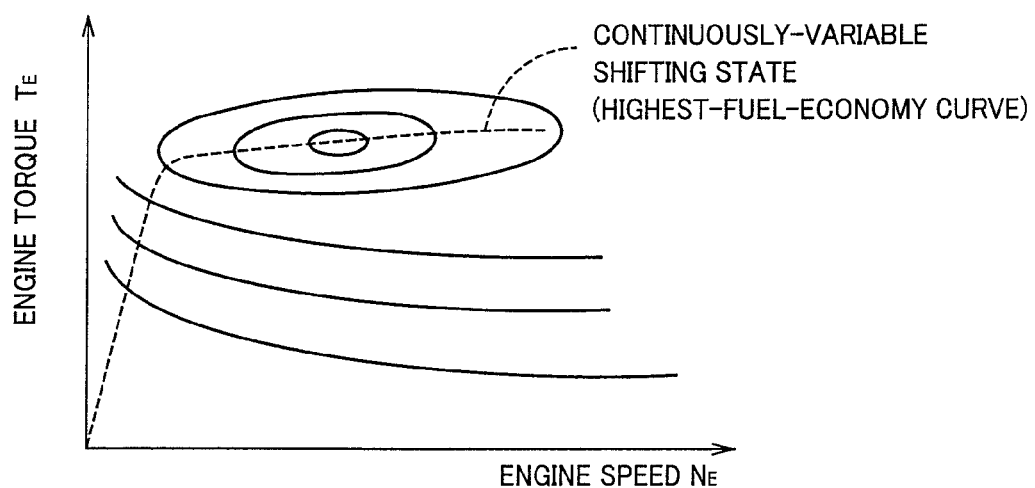
FIG. 9 is a view illustrating an example of a fuel consumption map defining a highest-fuel-economy curve of an engine (indicated by broken line)

The hybrid control portion 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control portion 82 determines a target value of the overall speed ratio γT of the transmission mechanism 10, so that the engine 8 is operated according to a stored highest-fuel-economy curve (fuel-economy map or relation) indicated by broken line in FIG. 9. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control portion 82 controls the speed ratio γ0 of the differential portion 11, so as to obtain the target value of the overall speed ratio γT, so that the overall speed ratio γT can be controlled within a predetermined range.

In the hybrid control, the hybrid control portion 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control portion 84 is further arranged to hold the engine speed $N_E$ substantially constant or at a desired value, by controlling the first electric motor speed $N_{M1}$ and/or the second electric motor speed $N_{M2}$ owing to the electric CVT function of the differential portion 11, irrespective of whether the vehicle is stationary or running. In other words, the hybrid control portion 84 is capable of controlling the first electric motor speed $N_{M1}$ and/or the second electric motor speed $N_{M2}$ as desired while holding the engine speed $N_E$ substantially constant or at a desired value.

To raise the engine speed $N_E$ during running of the vehicle, for example, the hybrid control portion 84 raises the operating speed $N_{M1}$ of the first electric motor M1 since the transmitting-member speed $N_{18}$ is determined by the vehicle speed V (speed of the drive wheels 38), as is apparent from the collinear chart of FIG. 3. To hold the engine speed $N_E$ substantially constant during a shifting operation of the automatic transmission portion 20, the hybrid control portion 84 changes the first electric motor speed $N_{M1}$ in a direction opposite to the direction of change of the transmitting-member speed $N_{18}$ caused by the shifting operation of the automatic transmission portion 20, while the engine speed $N_E$ is held substantially constant.

The hybrid control portion 84 includes engine output control means functioning to command an engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and/or the timing of ignition of the igniter by the ignition device 68, alone or in combination.

For instance, the hybrid control portion 84 is basically arranged to control the throttle actuator 97 on the basis of the operation amount $A_{CC}$ of the accelerator pedal and according to a predetermined stored relationship (not shown) between the operation amount $A_{CC}$ and the opening angle $\theta_{TH}$ of the electronic throttle valve 62 such that the opening angle $\theta_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control portion 84.

The hybrid control portion 84 is capable of establishing a motor-drive mode to drive the vehicle by the electric motor, by utilizing the electric CVT function (differential function) of the differential portion 11, irrespective of whether the engine 8 is in the non-operated state or in the idling state. Generally, the hybrid control portion 84 establishes the motor-drive mode when the output torque $T_{OUT}$ is in a comparatively low range in which the engine efficiency is comparatively low, namely, when the engine torque $T_E$ is in a comparatively low range, or when the vehicle speed V is in a comparatively low range, that is, when the vehicle load is comparatively low. For reducing a dragging of the engine 8 in its non-operated state and improving the fuel economy in the motor-drive mode, the hybrid control portion 84 is configured to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled to be in a non-load state, so as to be freely rotated to have a negative speed $N_{M1}$.

The hybrid control portion 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 60 to the second electric motor M2 through the above-described electric path, so that the second electric motor M2 is operated to transmit a drive torque to the drive wheels 34.

The hybrid control portion 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control portion 84 is arranged to place the first electric motor M1 in the non-load state, for thereby placing the differential portion 11 in a neutral state in which the power transmitting path is electrically cut off.

The hybrid control portion 84 is further configured to control the second electric motor M2 such that the second electric motor M2 is operated as the electric generator by a kinetic energy of the running hybrid vehicle during coasting of the hybrid vehicle with the accelerator pedal held in its non-operated position, or during brake application to the hybrid vehicle. In this case, the kinetic energy by which the second electric motor M2 is driven is transmitted in the direction from the drive wheels 34 toward the engine 8. Thus, the hybrid control portion 84 functions as regeneration control means for charging the electric-energy storage device 56 with the electric energy which is generated by the second electric motor M2 and which is supplied through the inverter 54. According to a regeneration control by the regeneration control means, the amount of electric energy generated by the second electric motor M2 operating as the electric generator is controlled on the basis of the amount of electric energy SOS stored in the electric-energy storage device 56, and a braking force generated by a hydraulic braking system of the vehicle according to an amount of operation of a brake pedal.

The hybrid-drive-system starting portion 86 indicated above is a major part of the control apparatus according to the present embodiment, and is provided to effect quick or rapid starting of the hybrid vehicle drive system for starting the hybrid vehicle, that is, to quickly or rapidly place the hybrid vehicle drive system in a ready state in which the hydraulically operated frictional coupling devices in the form of the clutches C and brakes B of the automatic transmission portion 20 can be supplied with the working fluid the pressure of which is sufficient to permit starting of the vehicle at once. Usually, the hybrid vehicle is started by the second electric motor M2 with the engine 8 held at rest. The following description is based on an assumption that the vehicle is started by the second electric motor M2.

Generally, a diagnosis of a high-voltage electric system 75 of the hybrid vehicle drive system is initiated upon operation of a starter switch ST provided to start the hybrid vehicle drive system. Only after the diagnosis has revealed that the high-voltage electric system is normal, the high-voltage electric system becomes operable. In the hybrid vehicle drive system provided with the automatic transmission portion 20 as described above, a high voltage of a high-voltage source is lowered through a DCDC converter 74 to a level used to drive the electric oil pump 76 so that the hydraulically operated frictional coupling devices of the automatic transmission portion 20 are supplied with the working fluid of a suitable pressure level through the hydraulic control unit 70. Thus, the starting of the hybrid vehicle drive system requires a predetermined time after initiation of the diagnosis of the high-voltage electric system 75, and therefore the vehicle operator tends to be uncomfortable with slow or delayed starting of the hybrid vehicle. The hybrid-drive-system starting portion 86 is configured to shorten the time required for starting the hybrid vehicle drive system, for thereby reducing a risk of giving the vehicle operator a discomfort associated with the delayed starting of the hybrid vehicle.

The high-voltage electric-system starting portion 88 includes a starter-switch-state determining portion 88, a high-voltage-circuit ready-state determining portion 90 and a converter ready-state determining portion 92.

The starter-switch-state determining portion 88 is configured to determine whether the starter switch ST for starting the hybrid vehicle drive system has been operated, that is, whether the hybrid vehicle drive system is required to be started. Described in detail, the starter-switch-state determining portion 88 determines whether the starter switch ST ("POWER" switch) in the form of a pushbutton has been depressed (turned on) while a key (not shown) is inserted in a key slot provided on the hybrid vehicle. However, other conditions such as operation of the brake pedal should be satisfied for the starter-switch-state determining portion 88 to determine that the hybrid vehicle drive system is required to be started. When the starter switch ST has been operated, a READY light 78 included in an indicator device visible by the vehicle operator is brought to a flickering state indicating that the hybrid vehicle drive system is in the process of starting. After the starting of the hybrid vehicle drive system is completed, the READY light 78 is brought to an illuminated state (ON state). According to the principle of the present invention, the duration during which the READY light 78 is held in the flickering state is shortened.

The high-voltage-circuit ready-state determining portion 90 is configured to determine a high-voltage circuit of the high-voltage electric system 75 has been started or placed in a ready state. Described more specifically, the high-voltage-circuit ready-state determining portion 90 determines whether the diagnosis of the high-voltage circuit and required relay switching of the power source have been completed. After the high-voltage circuit is started or brought to the ready state, the high-voltage electric system is operable so that the first and second electric motors M1, M2, for example, are ready to operate.

The converter ready-state determining portion 92 is configured to determine whether the DCDC converter 74 has been started or placed in a ready state. The DCDC converter 74 is configured to lower the high voltage of the high-voltage source to a level of about 12-24 V, which is used for turning on various lights, operating an audio device and the electric oil pump 76, for instance. The converter ready-state determining portion 92 makes the determination as to whether the DCDC converter 74 is in the ready state, on the basis of a signal received from the DCDC converter 74.

The hybrid-drive-system starting portion 86 is configured to control the starting of the hybrid vehicle drive system, so as to shorten the time from the moment of operation of the starter switch ST (moment of initiation of flickering of the READY light 78) to the moment of completion of the starting of the hybrid vehicle drive system which permits the hydraulically operated frictional coupling devices of the automatic transmission portion 20 to be engaged with the working fluid the pressure of which is high enough to enable the engaged frictional coupling devices to have a sufficient torque capacity.

When the starter-switch-state determining portion 88 has determined that the starter switch ST has been operated, the hybrid-drive-system starting portion 86 commands the hybrid control portion 84 to start the high-voltage circuit of the high-voltage electric system 75. When the high-voltage-circuit-ready-state determining portion 90 has determined that the high-voltage circuit has been started or placed in the ready state in which the high-voltage electric system 75 is ready to operate, the hybrid-drive-system starting portion 86 starts the engine 8 which has been at rest, so that the mechanical oil pump 40 is operated by the engine 8. The engine 8 is started by operating the first electric motor M1. That is, the engine speed $N_E$ is first raised as a result of the differential function of the differential portion 11, to a level at which the ignition of the engine 8 is possible. Then, the engine 8 is started under the control of the engine-output control portion 58. Thus, the engine 8 is started by the hybrid-drive-system starting portion 86, to operate the mechanical oil pump 40 for delivering the pressurized working fluid of a predetermined pressure to the hydraulic control unit 70 to enable the frictional coupling devices C, B of the automatic transmission portion 20 to operate.

The predetermined pressure of the working fluid delivered by the mechanical oil pump 40 is determined theoretically or by experimentation. Described more specifically, the predetermined pressure permits the hydraulically operated frictional coupling devices C, B of the automatic transmission portion 20 to have a torque capacity enough to transmit the input torque received by the automatic transmission portion 20 during starting of the hybrid vehicle. For instance, the input torque of the automatic transmission portion 20 during starting of the hybrid vehicle is calculated on the basis of the operation amount $A_{CC}$ of the accelerator pedal, for example, and the hydraulic pressure (engaging pressure) of the relevant hydraulically operated frictional coupling devices (first clutch C1 and third brake B3 in the case of shifting the automatic transmission portion 20 to the first gear position) is determined on the basis of the calculated input torque so that the relevant frictional coupling devices can transmit the input torque. The pressure of the working fluid to be supplied to the hydraulic control unit 70 is determined to permit the frictional coupling devices to be engaged with the determined engaging pressure. The pressure of the working fluid delivered from the mechanical oil pump 40 is raised to the thus determined engaging pressure, which is the above-indicated predetermined pressure of the working fluid, which is as low as possible for minimum fuel consumption by the engine 8 but is high enough to prevent slipping of the frictional coupling devices placed in the engaged state. In this respect, it is noted that the engine 8 need not be started to operate the mechanical oil pump 40 to deliver the pressurized working fluid of the predetermined pressure. Namely, the engine 8 need not be supplied with a fuel, but may be operated or driven in the fuel-cut state by the drive force received from the first electric motor M1, to operate the mechanical oil pump 40.

After the high-voltage circuit has been started, the hybrid-drive-system starting portion 86 initiates the starting of the DCDC converter 74. When the converter ready-state determining portion 92 has determined that the DCDC converter 74 has been started or placed in the ready state, the electric oil pump 76 becomes ready to operate by the electric power the voltage of which is lowered by the DCDC converter 74. Like the mechanical oil pump 40, the electric oil pump 76 delivers the pressurized working fluid of the predetermined pressure to the hydraulic control unit 70. After the electric oil pump 76 has been operated to deliver the pressurized working fluid to the hydraulic control unit 70, the engine 8 is stopped to stop the operation of the mechanical oil pump 40, so that the pressurized fluid is subsequently delivered to the hydraulic control unit 70 from only the electric oil pump 76.

When the pressurized working fluid of the predetermined pressure has been supplied from the mechanical oil pump 40 to the hydraulic control unit 70, the hybrid-drive-system starting portion 86 determines that the hybrid vehicle drive system has been started or placed in the ready state in which the hybrid vehicle can be started. In this case, the hybrid-drive-system starting portion 86 commands the READY light 78 to be held in the on state. The pressure of the pressurized working fluid is detected by a pressure sensor provided in a fluid passage through which the pressurized working fluid is supplied to the hydraulic control unit 70. Namely, the determination as to whether the hybrid vehicle drive system has become ready to operate is made on the basis of the detected pressure of the pressurized working fluid.

As described above, the hydraulically operated frictional coupling devices of the automatic transmission portion 20 can be supplied with the working fluid of the predetermined pressure delivered from the mechanical oil pump 40, to permit starting of the hybrid vehicle, without having to await the starting of the electric oil pump 76 and a subsequent rise of the working fluid delivered from the electric oil pump 76, to the predetermined pressure level. That is, the time required for starting the hybrid vehicle drive system is shorted according to the control apparatus of the present embodiment including the hybrid-drive-system starting portion 86, by a time conventionally required for raising the pressure of the working fluid delivered from the electric oil pump 76, during which time the mechanical oil pump 40 is operated to deliver the working fluid of the predetermined pressure to the hydraulic control unit 70 in the present embodiment.

Figure 10:
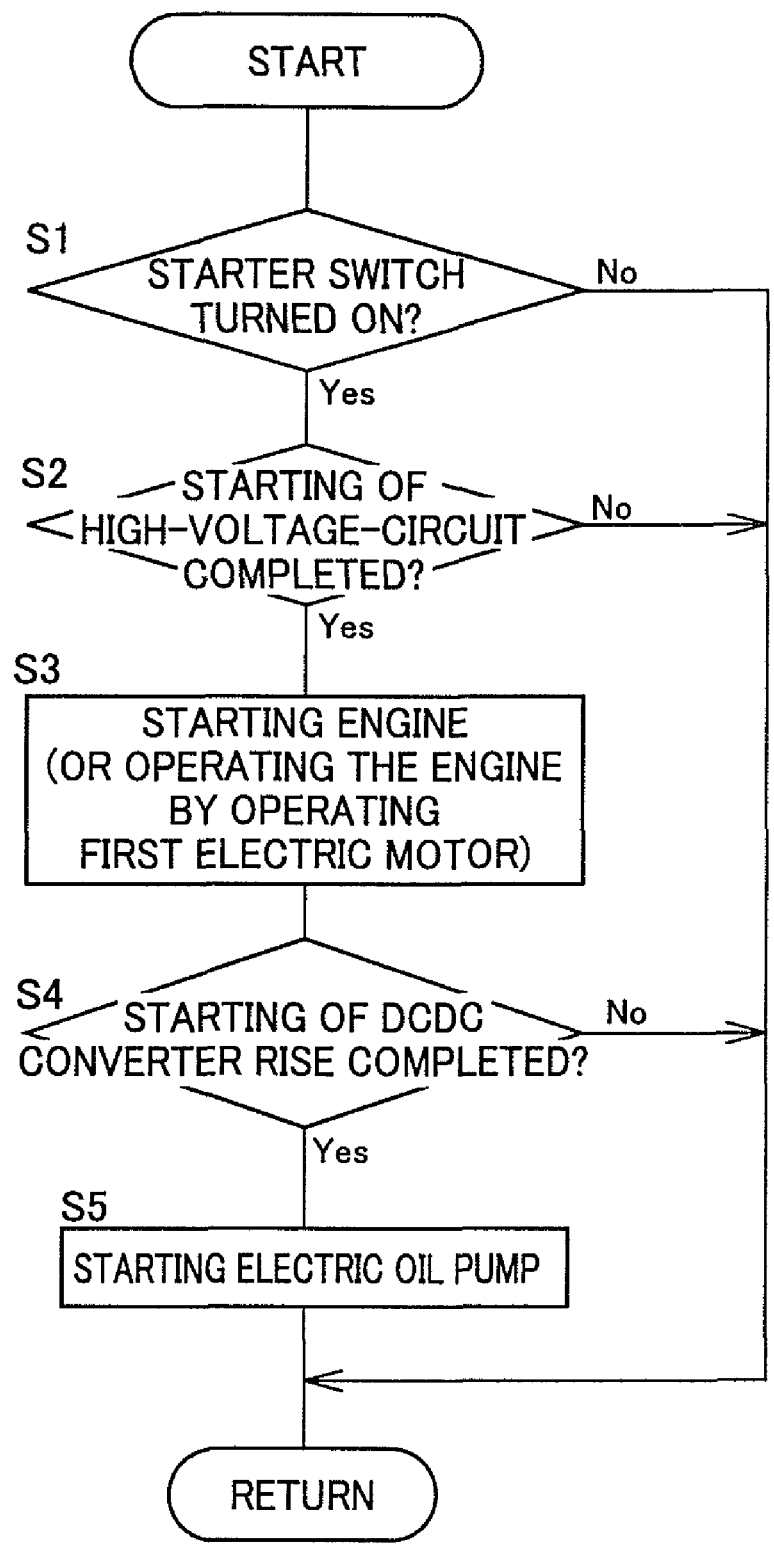
FIG. 10 is a flow chart illustrating a control routine executed by the electronic control device of FIG. 4, for quick starting of the hybrid vehicle drive system.

Referring next to the flow chart of FIG. 10, there is illustrated a control routine executed by the electronic control device 80 for quick or rapid starting of the hybrid vehicle drive system. This control routine is repeatedly executed with an extremely short cycle time of about several milliseconds to several tends of milliseconds.

The control routine of FIG. 10 is initiated with step S1 corresponding to the starter-switch-state determining portion 88, to determine whether the starter switch ST has been operated or turned on, that is, whether the hybrid vehicle drive system is required to be started. If a negative determination is obtained in step S1, the present control routine is terminated.

If an affirmative determination is obtained in step S1, on the other hand, the READY light 78 begins to flicker, and the control flow goes to step S2 corresponding to the high-voltage-circuit ready-state determining portion 90 to determine whether high-voltage circuit of the high-voltage electric system 75 has been started or placed in the ready state. If a negative determination is obtained in step S2, the present control routine is terminated.

If an affirmative determination is obtained in step S2, on the other hand, the control flow goes to step S3 corresponding to the hybrid-drive-system starting portion 86, in which the engine which has been at rest is started or operated by operating the first electric motor M1. As a result, the mechanical oil pump 40 is operated to deliver the pressurized working fluid of the predetermined pressure to the hydraulic control unit 70 for the automatic transmission portion 20. When it is determined that the hydraulic control unit 70 has been supplied with the working fluid of the predetermined pressure, the READY light is illuminated. In this condition, the hybrid vehicle can be started. Then, the control flow goes to step S4 corresponding to the converter ready-state determining portion 92, to determine whether the DCDC converter 74 has been started or placed in the ready state. If a negative determination is obtained in step S4, the control routine is terminated.

If an affirmative determination is obtained in step S4, the control flow goes to step S5 corresponding to the hybrid-drive-system starting portion 86, in which the electric oil pump 76 is operated (started) to deliver the pressurized working fluid of the predetermined pressure to the hydraulic control unit 70, and the present control routine is terminated. When it is determined that the hydraulic control unit 70 has been supplied with the working fluid of the predetermined pressure delivered from the electric oil pump 76, the engine 8 is stopped to turn off the mechanical oil pump 40 for stopping the supply of the pressurized working fluid to the hydraulic control unit 70.

As described above, the control apparatus of the present embodiment for the hybrid vehicle drive system includes the hybrid-drive-system starting portion 86 which is configured to start the engine 8 or operate the first electric motor M1 to operate the engine 8, upon starting of the hybrid vehicle drive system, for operating the mechanical oil pump 40 to deliver the pressurized working fluid of the predetermined pressure to the hydraulic control unit 70. Namely, before the electric oil pump 76 is operated to deliver the pressurized fluid, the mechanical oil pump 40 is operated by the engine 8 to deliver the working fluid of the predetermined pressure to the hydraulic control unit 70. Accordingly, the present control apparatus eliminates a need of awaiting slow or delayed starting of the electric oil pump 76, and makes it possible to shorten the time required for starting the hybrid vehicle drive system, by operating the mechanical oil pump 40 prior to the slow starting of the electric oil pump 76.

The present control apparatus is further configured such that the predetermined pressure of the pressurized working fluid delivered from the mechanical oil pump permits the hydraulically operated automatic transmission portion to have a torque capacity enough to transmit an input torque received by the automatic transmission portion during starting of the hybrid vehicle. Accordingly, the hybrid vehicle can be started immediately after the starting of the hybrid vehicle drive system is completed.

The present control apparatus is further configured such that the hybrid-drive-system starting portion 86 operates the first electric motor M1 to start the engine 8, upon starting of the hybrid vehicle drive system, such that the operating speed $N_E$ of the engine 8 is raised to a level at which ignition of the engine 8 is possible. Accordingly, the engine 8 can be suitably ignited and rapidly started.

In the present control apparatus, the hybrid-drive-system starting portion 86 includes the high-voltage-circuit ready-state determining portion 90 and the converter ready-state determining portion 92 which are configured to determine whether the electric oil pump 76 can be started. The hybrid-drive-system starting portion 86 starts the electric oil pump 76 when the determining portions 90, 92 have determined that the electric oil pump 76 can be started. The hybrid-drive-system starting portion stops the mechanical oil pump 40 when the pressure of the pressurized working fluid delivered from the electric oil pump 76 to the hydraulic control unit 70 is raised to the predetermined level. Thus, the mechanical and electric oil pumps 40, 76 are selectively operated with high operating efficiency. Generally, a hybrid vehicle tends to have a low operating efficiency of its engine during its starting or during its running at a relatively low speed or with a relatively small drive torque. In view of this tendency, the hybrid vehicle is usually driven by an electric motor with the engine held at rest, during its starting or low-speed or small-torque running. According to the hybrid vehicle control apparatus constructed according to the present embodiment, the mechanical oil pump 40 is stopped, that is, the engine 8 is stopped when the electric oil pump 76 becomes operable to deliver the working fluid of the predetermined pressure. Accordingly, the deterioration of the fuel economy of the hybrid vehicle due to operation of the engine 8 during starting of the vehicle can be reduced.

In the hybrid vehicle drive system described above, the differential portion 11 and the automatic transmission portion 20 cooperate to function as a continuously variable transmission the output torque of which can be smoothly changed. Further, the differential portion 11 can function not only as an electrically controlled continuously variable transmission the speed ratio of which is continuously variable, but also as a step-variable transmission the speed ratio of which is variable in steps, so that the overall speed ratio of the hybrid vehicle drive system can be changed in steps, whereby the vehicle drive torque can be rapidly changed.

In the hybrid vehicle drive system described above, the differential portion 11 functioning as an electrically controlled continuously variable transmission cooperates with the step-variable automatic transmission portion 20 to constitute a continuously variable transmission the output torque of which can be smoothly changed. Further, while the speed ratio of the differential portion 11 is held constant, the differential portion 11 and the step-variable automatic transmission portion 20 cooperate to function substantially as a step-variable transmission, so that the overall speed ratio of the hybrid vehicle drive system can be changed in steps, whereby the vehicle drive torque can be rapidly changed.

While the preferred embodiment of this invention haw been described in detail by reference to the accompanying drawings, it is to be understood that the present invention may be otherwise embodied.

For example, the step-variable automatic transmission portion 20 which is used as a hydraulically operated automatic transmission portion in the illustrated embodiment may be replaced by a belt-and-pulley type continuously-variable transmission or any other type of hydraulically operated automatic transmission portion.

In the illustrated embodiment, the second electric motor M2 is directly connected to the power transmitting member 18. However, the second electric motor M2 may be connected, either directly or indirectly via a transmission, to any portion of the power transmitting path between the differential portion 11 and the drive wheels 34.

Although the differential portion 11 functions as an electrically controlled continuously variable transmission the gear ratio γ0 of which is continuously variable from the minimum value $\gamma 0_{min}$ to the maximum value $\gamma 0_{max}$, the differential portion 11 may be modified such that its speed ratio γ0 is not variable continuously, but is variable in steps by utilizing its differential function. The present invention is applicable to a hybrid vehicle drive system including the differential portion modified as described above.

Further, the differential portion 11 provided in the illustrated embodiment may be provided with a differential limiting device which is incorporated in the power distributing mechanism 16 and which is operable as a step-variable transmission having two forward-drive positions by limiting the differential function of the differential portion 11.

In the power distributing mechanism 16 in the illustrated embodiment, the first carrier CA1 is fixed to the engine 8, and the fist sun gear S1 is fixed to the first electric motor M1 while the first ring gear R1 is fixed to the power distributing member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated embodiment, the first and second electric motors M1, M2 are disposed coaxially with the input shaft 14 such that the first electric motor M1 is connected to the first sun gear S1 while the second electric motor M2 is connected to the power transmitting member 18. However, this arrangement is not essential. For instance, the first electric motor M1 may be operatively connected to the first sun gear S1 through gears, a belt or a speed reduction device, while the second electric motor M2 may be connected to the power transmitting member 18.

In the illustrated embodiment, the automatic transmission portion 20 is connected in series to the differential portion 11 through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

Further, the power distributing mechanism 16 provided in the illustrated embodiment may be replaced by a differential gear device including a pinion rotated by the engine 8, and a pair of bevel gears which mesh with the pinion and which are operatively connected to the first electric motor M1 and the power transmitting member 18 (second electric motor M2).

While the power distributing mechanism 16 in the illustrated embodiment is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type. Where the two or more planetary gear sets are used, the rotary elements of each planetary gear set are connected to respective ones of the engine 8, first and second electric motors M1, M2 and power transmitting member 18, and clutches and brakes may be disposed for connecting the selected rotary elements to each other or selectively fixing the selected rotary element to the stationary member, so that the power distributing mechanism 16 is switchable between the step-variable shifting state and the continuously-variable shifting state.

While the engine 8 and the differential portion 11 are connected directly to each other in the illustrated embodiment, the engine 8 and the differential portion 11 may be connected to each other through a clutch interposed therebetween.

Although the differential portion 11 and the automatic transmission portion 20 are connected directly to each other in the illustrated embodiment, this arrangement is not essential, and the differential portion 11 and the automatic transmission portion 20 need not be mechanically independent of each other, provided the transmission mechanism 10 provided with the differential portion 11 and automatic transmission portion 20 is operable as a whole to selectively function as an electrically controlled differential portion or a transmission capable of shifting in a manner different from that of the electrically controlled differential portion.

In the illustrated embodiment, the manually operable shifting device 50 is provided with the shift lever 50 manually operable to select one of the plurality of shift positions $P_{SH}$. However, the shift lever 50 may be replaced by pushbutton switches, a slide-type or any other type of switch manually operable to select a desired one of the shift positions $P_{SH}$, or replaced by devices not operated by hand, such as a device operated in response to a voice of the vehicle operator or operated by foot, to select one of the shift positions $P_{SH}$. Although the shift lever 50 has the manual forward-drive position M for selecting the number of the forward-drive gear positions available for automatic shifting of the automatic transmission portion 20, the shift lever 50 placed in the manual forward-drive position M may be used to manually shift up or down the automatic transmission portion 20, within the range from the first gear position through the fourth gear position, by operating the shift lever 50 from the position M to the shift-up position "+" or shift-down position "−".

It is to be understood that the embodiment of the invention has been descried for illustrative purpose only, and that the present invention may be embodied with various changes and modifications which may occur to those skilled in the art.

What is claimed is:

1. A control apparatus for a hybrid vehicle drive system including (a) an engine, (b) an electrically controlled differential portion having an input shaft connected to the engine, an output shaft, a differential mechanism, and an electric motor which is operatively connected to a rotary element of the differential mechanism and an operating state of which is controlled to control a differential state between rotating speeds of the input and output shafts, (c) a hydraulically operated automatic transmission portion which constitutes a part of a power transmitting path between the electrically controlled differential portion and a drive wheel of a hybrid vehicle, said control apparatus comprising:
- (d) a hydraulic control unit for controlling the hydraulically operated automatic transmission portion,
- (e) a mechanical oil pump operable by the engine to deliver a pressurized working fluid to the hydraulic control unit, and
- (f) an electric oil pump electrically operated independently of the mechanical oil pump, to deliver a pressurized working fluid to the hydraulic control unit, and a hybrid-drive-system starting means configured for determining starting of the hybrid vehicle drive system, inhibiting injection of a fuel and to operate the engine by the electric motor upon determination of starting of the hybrid vehicle drive system, operating the mechanical oil pump to deliver the pressurized working fluid of a predetermined pressure to the hydraulic control unit while the injection of the fuel is inhibited and the engine is operated by the electric motor, stopping the mechanical oil pump and operating the electric oil pump only after obtaining the pressurized working fluid of the predetermined pressure, and injecting the fuel to the engine only after obtaining the pressurized working fluid of the predetermined pressure.

2. The control apparatus according to claim 1, wherein the predetermined pressure of the pressurized working fluid is a pressure which permits the hydraulically operated automatic transmission portion to have a torque capacity enough to transmit an input torque received by the automatic transmission portion during starting of the hybrid vehicle.

3. The control apparatus according to claim 1, wherein said electrically controlled differential portion is operable as a continuously variable transmission mechanism by controlling the operating state of the electric motor.

4. The control apparatus according to claim 1, wherein the hydraulically operated automatic transmission portion is a step-variable automatic transmission a speed ratio of which is variable in steps.

5. The control apparatus according to claim 2, wherein said electrically controlled differential portion is operable as a continuously variable transmission mechanism by controlling the operating state of the electric motor.

6. The control apparatus according to claim 2, wherein the hydraulically operated automatic transmission portion is a step-variable automatic transmission a speed ratio of which is variable in steps.

7. The control apparatus according to claim 3, wherein the hydraulically operated automatic transmission portion is a step-variable automatic transmission a speed ratio of which is variable in steps.

\* \* \* \* \*